UNITED STATES PATENT OFFICE.

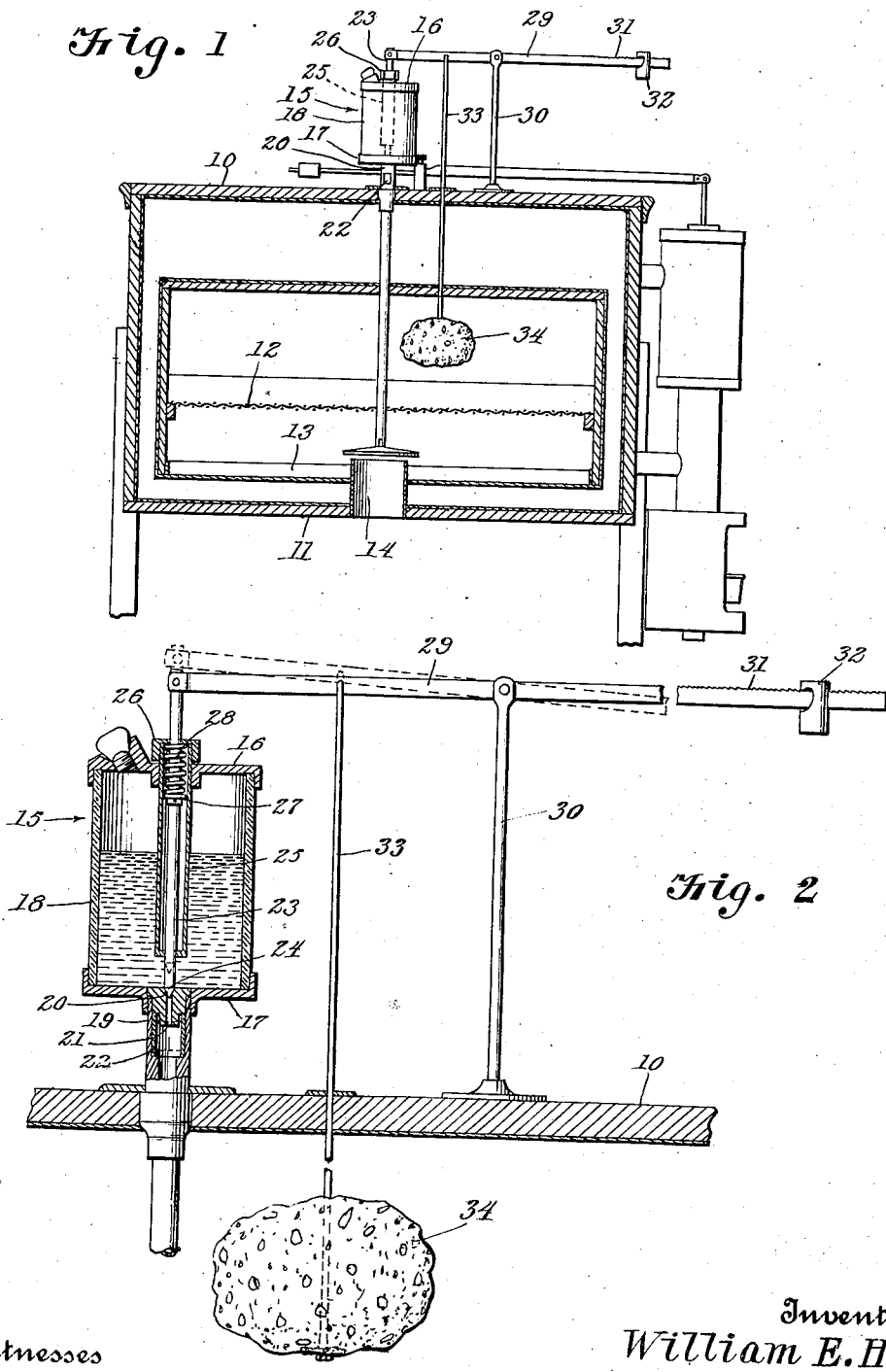

WILLIAM E. HILL, OF ALTON, NEW HAMPSHIRE.

INCUBATOR ATTACHMENT.

1,351,647.

Specification of Letters Patent. Patented Aug. 31, 1920.

Application filed April 1, 1919. Serial No. 286,702.

*To all whom it may concern:*

Be it known that I, WILLIAM E. HILL, a subject of the King of Great Britain, residing at Alton, in the county of Belknap and State of New Hampshire, have invented new and useful Improvements in Incubator Attachments, of which the following is a specification.

This invention relates to improvements in incubators, the object being to provide means for automatically controlling the degree of moisture within the incubator to facilitate hatching.

Another object is to provide a moisture container having valve controlled communication with the interior of the incubator, the valve being so balanced as to be normally closed to cut off the moisture supply but automatically opened when the humidity within the incubator falls to a predetermined degree, thereby maintaining an even degree of humidity within the incubator at all times.

With the above and other objects in view, the invention includes the following novel details of construction, combination and arrangement of parts, to be hereinafter more fully described and illustrated in the accompanying drawings.

In the drawings:

Figure 1 is a sectional view through an incubator equipped with the invention.

Fig. 2 is an enlarged sectional view through the reservoir or moisture container showing the valve and controlling means therefor.

Referring to the drawings in detail, like characters of reference denote corresponding parts throughout the several views.

The incubator, which may be of any desired construction, includes a top 10 and a bottom 11 and the usual egg tray or trays 12. The bottom 11 is equipped with the usual moisture tray 13, having openings 14 therein to admit the passage of outside air.

Suitably supported from the top 10 of the incubator is a reservoir or container 15. This container is preferably of cylindrical form and includes a top 16 and a bottom 17, spaced apart and connected by a preferably transparent cylinder 18. The reservoir or container 15 is in communication with the interior of the incubator through the medium of a pipe 19. At the juncture of the pipe and the reservoir or container there is provided a valve seat 20, which surrounds a port 21 leading from the reservoir or container into the pipe, whereby water from the reservoir or container may pass through the pipe into the incubator. Located below the port 21 is a sight glass 22, the purpose of which is apparent.

A plunger 23 extends longitudinally through the reservoir or container 15 and one end of this plunger is tapered to provide a valve 24, which is adapted to be seated within the valve seat 20 to cut off communication. The plunger 23 is guided in a sleeve 25 supported by the top 16 of the reservoir or container. The upper end of the sleeve 25 is provided with a threaded cap 26, which forms a guide for the upper end of the plunger and between this cap and a collar 27, secured upon the plunger 23, is a coil spring 28, the function of which is to normally seat the valve.

Pivotally connected to the upper end of the plunger 23 is a balance beam 29, the said beam being pivotally supported upon a standard 30 mounted upon the top 10 of the incubator. The free end of the beam is notched or serrated, as shown at 31, to provide for adjustably holding a weight 32. The purpose of the weight 32 is to delicately balance the plunger, so that the valve 24 will be normally seated to cut off the supply of moisture from the reservoir or container 15.

Pivotally connected to the balance beam 29 between the reservoir or container 15 and the standard 30 is one end of a rod 33, said rod passing through the top 10 of the incubator and carrying at its opposite end an absorbent element 34, shown as formed of a sponge which is adapted to take up moisture within the incubator, the weight of this moisture together with the spring 28 being sufficient to hold the valve 24 seated. Should the absorbent element 34 become dry, due to lack of outside moisture entering the incubator, said element will be lightened, whereupon the weight 32 will over-balance the beam 29 and cause the valve to open to admit moisture into the interior of the incubator from the container or reservoir 15. After a sufficient amount of moisture has been admitted to the incubator and absorbed by the absorbent element, the additional weight thus added will over-balance the weight 32 and seat the valve 24 to cut off the supply from the reservoir or container.

It is believed that from the foregoing description and accompanying drawings, the construction, operation and advantages of the invention will be apparent. The right is reserved to make such changes in the form, proportions and minor details of construction as properly fall within the scope of the appended claims.

Having described the invention, what is claimed is:

1. The combination with an incubator, of a water reservoir communicating with the interior of the incubator to supply moisture, a spring actuated plunger valve within the reservoir for controlling the supply of water to the incubator and means controlled by the degree of moisture within the incubator for operating the valve.

2. The combination with an incubator, of a water reservoir communicating with the interior of the incubator to supply moisture, a plunger valve within the reservoir for controlling the supply of water to the incubator, a pivoted balance beam connected to said valve, a rod connected to the beam and extending within the incubator and a sponge located within the incubator and carried by the rod for controlling the position of the beam to open and close the valve.

3. The combination with an incubator, of a water reservoir comprising a casing communicating with the interior of the incubator to supply moisture thereto, a valve seat located within the reservoir, a plunger valve also located within the reservoir and coöperating with the valve seat for cutting off communication between the reservoir and incubator, a guide sleeve supported within the reservoir and surrounding the plunger valve and means controlled by the degree of moisture within the incubator for operating said valve.

In testimony whereof I affix my signature.

WILLIAM E. HILL.